(No Model.)
T M. SHARPE.
CAR COUPLING.
No. 263,972. Patented Sept. 5, 1882.
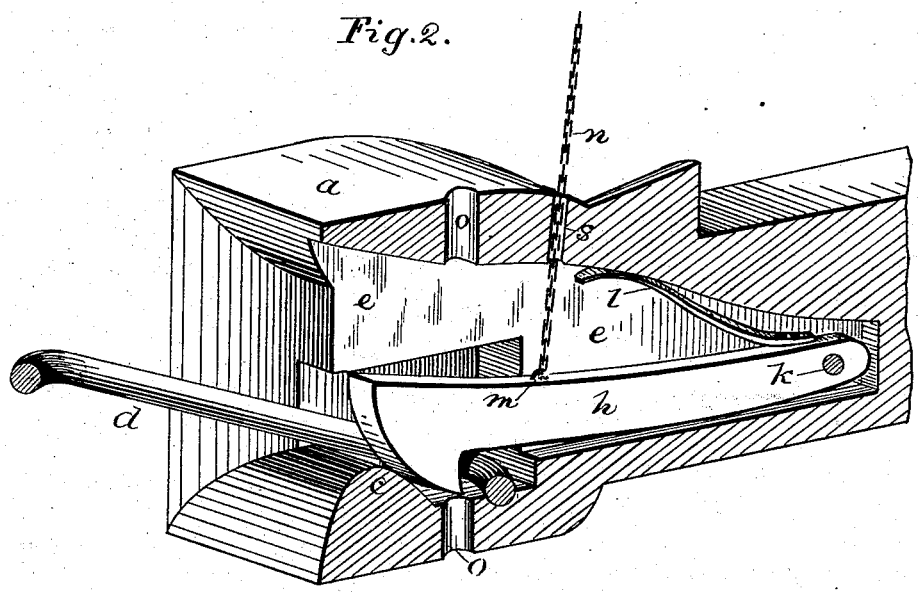
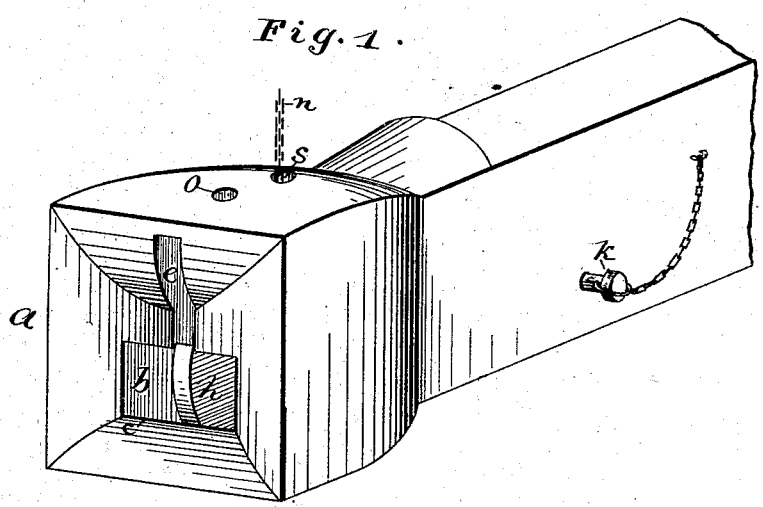
WITNESSES:
Thos Houghton.
W Read
INVENTOR:
Theo. M. Sharpe
BY
ATTORNEYS.

UNITED STATES PATENT OFFICE.

THEODORE M. SHARPE, OF SALISBURY, MISSOURI.

CAR-COUPLING.

SPECIFICATION forming part of Letters Patent No. 263,972, dated September 5, 1882.

Application filed March 30, 1882. (No model.)

*To all whom it may concern:*

Be it known that I, THEODORE MONROE SHARPE, of Salisbury, in the county of Chariton and State of Missouri, have invented a new and useful Improvement in Car-Couplings; and I do hereby declare that the following is a full, clear, and exact description of the same, reference being had to the accompanying drawings, forming a part of this specification, in which—

Figure 1 is a perspective view of my improved car-coupling, and Fig. 2 is a sectional elevation in perspective.

My invention relates to improvements in car-couplings; and it consists in the peculiar arrangement and construction of the parts, as hereinafter more fully set forth.

In the accompanying drawings, $a$ represents a draw-head, provided with the usual central box-shaped opening, $b$, for the entrance of the coupling-link. The floor or bottom of the opening $b$ is cut away or hollowed out, so as to form a shoulder, $c$, at the front end of the bottom of the opening $b$, on which shoulder the coupling-link $d$ is adapted to rest.

$e$ represents a narrow longitudinal slot or groove leading from the rear end and top of the opening $b$ in the draw-head $a$, and adapted to receive an elongated hook, $h$, pivoted near its rear end in the rear end of the longitudinal slot $e$ by a pin, $k$, passing through transverse holes in the draw-head and hook $h$, and secured by a chain to the side of the draw-head to prevent the loss of the pivotal pin.

To the upper edge of the hook $h$, and near its rear end, is secured a flat spring, $l$, the upper free end of which bears against the upper edge of the longitudinal slot or groove $e$ in the draw-head, the tension of the spring being constantly exerted to force the hook down into engagement with the coupling-link $d$.

$m$ represents a staple secured to the upper edge of the hook $h$, near its front end.

$n$ represents a chain secured to the staple $m$, and passing thence through a vertical hole, $s$, in the draw-head, whereby the cars may be uncoupled.

$o\ o$ are opposite holes made in the horizontal faces of the draw-head for the passage of an ordinary coupling-pin through the coupling-link in case the hook should be broken or out of order.

When the link is in a draw-head the spring on the hook bears the inner end of the link down behind the shoulder $c$, which elevates the outer end of the link and enables the operator to couple to a draw-head of greater height.

When necessary to couple to a lower draw-head than the one to which the link is secured the hook can be raised by its chain, when the link will fall to the proper level for coupling the cars.

I am aware that a hook pivoted in a draw-head and pressed downwardly by a spring to cause it to engage with a link secured in an opposite draw-head after said link has raised the hook by its impact with it, thereby automatically coupling the cars, is not new, broadly, and I therefore lay no claim to such construction, my invention being confined to the peculiar construction and arrangement of parts as pointed out in the claim, whereby the link is adapted to be guided into draw-heads of the same or different heights.

What I claim as my invention, and desire to secure by Letters Patent, is—

The combination, with the draw-head $a$, provided with the central opening, $b$, having shoulder $c$ at its front end, groove $e$, and hole $s$, of the hook $h$, pivoted in the rear end of the groove $e$, and provided with the spring $l$, staple $m$, and chain $n$, substantially as described, and for the purpose set forth.

THEODORE MONROE SHARPE.

Witnesses:
WM. M. BOSTAPH,
ED. E. YATES.